R. W. ROSEBROUGH.
ANGLE ROAD TRUCK.
APPLICATION FILED DEC. 12, 1911.
1,032,944.
Patented July 16, 1912.
2 SHEETS—SHEET 1.
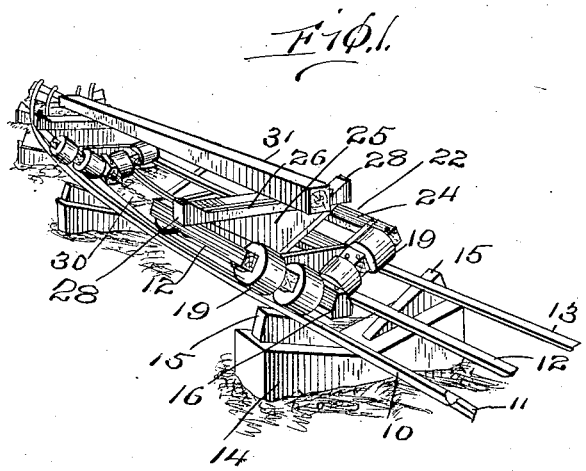
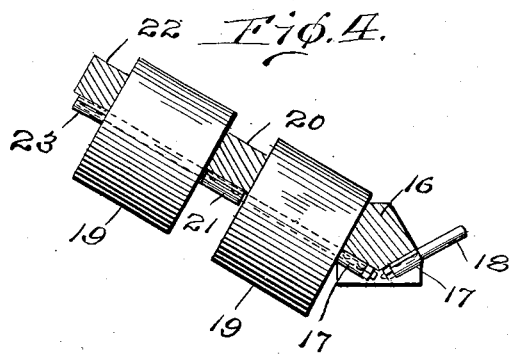
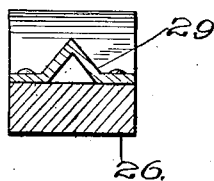
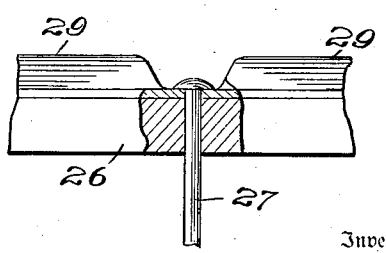
Witnesses
Inventor
Robert W. Rosebrough,
By Mason Fenwick & Lawrence,
Attorneys R. W. ROSEBROUGH.
ANGLE ROAD TRUCK.
APPLICATION FILED DEC. 12, 1911.
1,032,944.
Patented July 16, 1912.
2 SHEETS—SHEET 2.
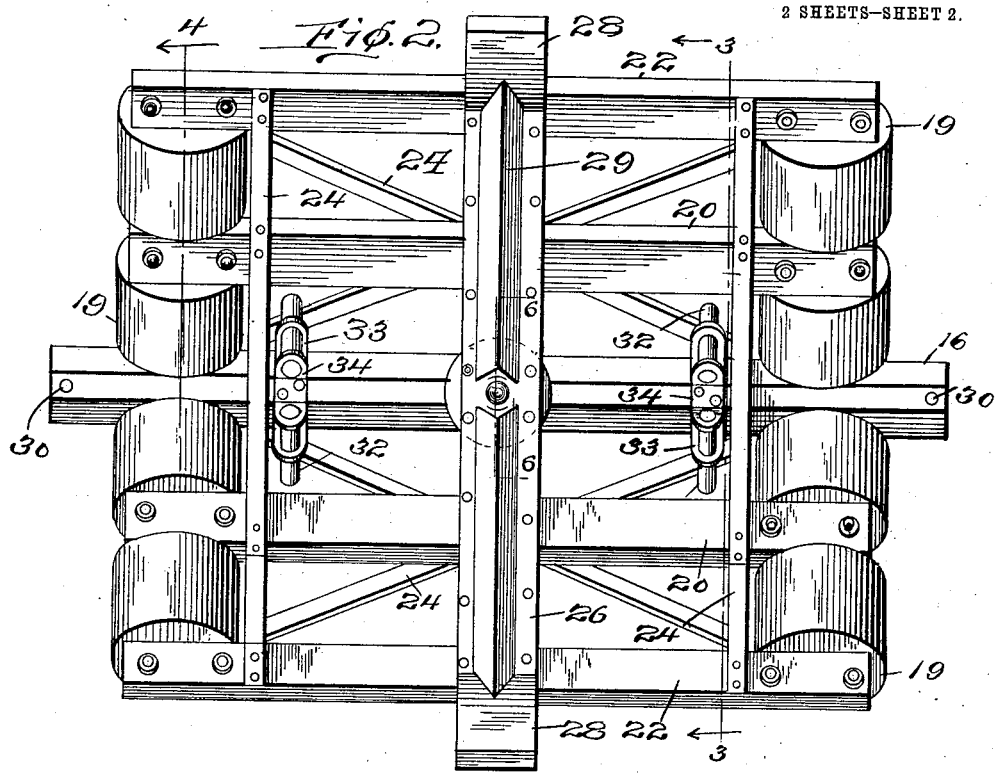
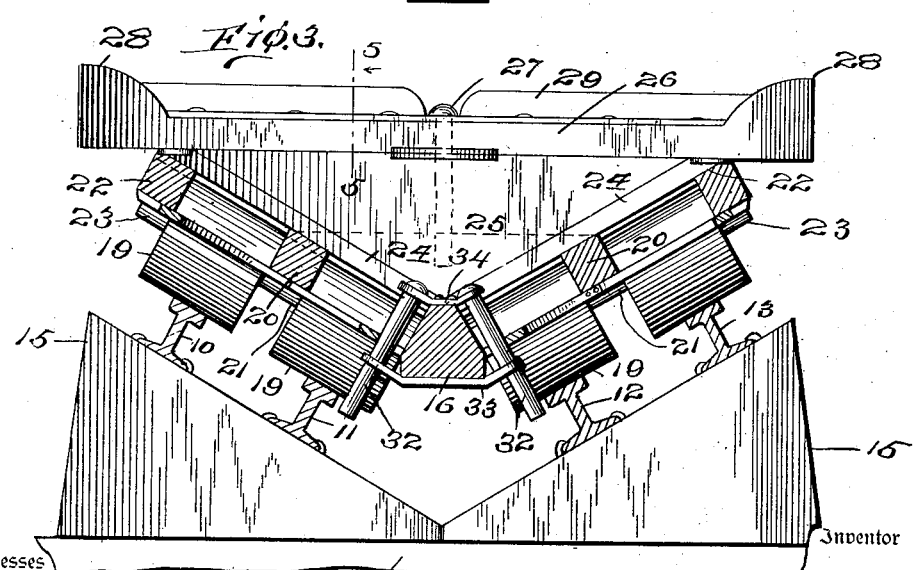

UNITED STATES PATENT OFFICE.

ROBERT W. ROSEBROUGH, OF PORTLAND, OREGON.

ANGLE ROAD-TRUCK.

1,032,944.

Specification of Letters Patent.

Patented July 16, 1912.

Application filed December 12, 1911. Serial No. 665,261.

*To all whom it may concern:*

Be it known that I, ROBERT W. ROSE-BROUGH, a citizen of the United States, residing at Portland, in the county of Multnomah and State of Oregon, have invented certain new and useful Improvements in Angle Road-Trucks; and I do hereby declare the following to be a full, clear, and exact description of the invention, such as will enable others skilled in the art to which it appertains to make and use the same.

This invention relates to angle trucks and has for an object to provide a truck of the general class disclosed in my Patent No. 1,006,287 issued to me October 17th, 1911, and to provide improvements in and about the construction and operation of said truck whereby it is adapted to a greater variety of purposes than that which forms the subject matter of my said patent.

A further object of the invention is to provide angle trucks with improved means whereby two or more of such trucks may be associated to carry and support a long load, as for instance logs, timbers or the like.

A further object of the invention is to provide in an angle truck bolsters carried by said truck adapted to support a load which extends beyond the lines of the truck.

With these and other objects in view the invention comprises certain novel constructions, combinations and arrangements of parts as will be hereinafter more fully described and claimed.

In the drawings:—Figure 1 is a perspective view of two of the improved trucks connected in tandem mounted upon a track and provided with a load. Fig. 2 is a top plan view of one of the trucks. Fig. 3 is a transverse sectional view of one of the trucks taken on line 3—3 of Fig. 3. Fig. 4 is a sectional view of a fragment of the truck as indicated by line 4 of Fig. 2, but showing the supporting rollers in elevation. Fig. 5 is a transverse sectional view through one of the bolsters as indicated by line 5—5 of Fig. 3. Fig. 6 is a detail view of a fragment at the center of the bolster, parts being broken away to show the king bolt in elevation.

Like characters of reference indicate corresponding parts throughout the several views.

The improved truck which forms the subject matter of this application is adapted to travel upon a track consisting of a plurality of rails preferably disposed in planes inclined to each other, as for instance the rails, 10, 11, 12 and 13, such rails being supported upon cross ties or sleepers 14 either straight as shown at Fig. 3 or with inclined tops as shown at Fig. 1, and also preferably by the use of shims 15 which shims may be varied as to inclination as necessity may require.

As shown particularly at Fig. 1, it is proposed to employ two or more of the trucks and as the trucks are similar the description of one will be a description of both or all. The truck comprises a central beam 16 having preferably inclined opposite sides so that the beam is formed substantially as a truncated pyramid and provided with bearing boxes 17 to receive axle shafts 18 upon which are mounted rollers 19. Preferably eight of the rollers 19 are provided in each of the trucks mounted in four pairs upon opposite sides of the central beam 16 and the pairs spaced apart by beams 20 which said beams 20 are also provided with bearing boxes 21 to accommodate the axle shafts 18. Outer frame strips 22 are also provided as an outer member for the frame, such strips being positioned upon the exterior of the outer rollers 19 and are provided with bearing boxes 23 in alinement with the bearing boxes 17 and 21 to position the outer extremities of the axle shafts 18.

The frame pieces 16, 20 and 22 are secured together by any approved bracing 24 whereby said organized structure is adapted to withstand torsional and other strains. It will be apparent that bracings extending along the upper surfaces of the beams 16, 20 and 22 will be inclined toward each other as indicated particularly in Fig. 3, to form substantially a triangle. At the center such triangle is preferably filled by a triangular block 25 the upper edge of which is even with or extends above the top of the side strips 22 so that a straight bolster 26 may rest thereon and be secured pivotally thereto by means of a king bolt 27. The ends of the bolster 26 are preferably formed as upstanding abutments 28 while between such abutments a rib 29 is located, such rib extending from abutment to abutment with the exception of a portion at the center which is cut away, as shown at Fig. 6, to accommodate the king bolt 27.

As it is the intention to employ the truck shown in the present disclosure in pairs or multiple, the beams 16 are preferably provided at their opposite ends with holes 30 to which a chain 30' may be connected to connect such trucks for the reason that when the trucks may be moving unloaded it is necessary to connect them together in such manner. When loaded as for instance with the timber 31 shown in Fig. 1 the use of such connecting means would not be essential but is desirable when the load thus represented is removed.

To prevent the truck from lateral motion and from leaving the track, especially on a curve, rollers 32 are employed journaled upon the center beam 16 as by means of brackets 33 and 34. These rollers 32 engage the inner sides of the inner rails 11 and 12 as indicated more particularly in Fig. 3.

I claim:—

1. In an angle road truck, a body portion formed with a plurality of longitudinal beams on each side, and a longitudinal beam arranged centrally, a plurality of diagonally arranged braces on each side, a plurality of connecting strips extending transversely of the beams, and a wedge shaped angle member connected with each of said connecting strips.

2. In an angle road truck, a body portion, a wedge shaped angle member arranged on said body portion and pressing the sides thereof, a pivotally mounted bolster arranged on the angle member, and a plurality of traction wheels connected to said body portion.

3. In an angle road truck, a body portion, a plurality of traction wheels mounted thereon, an angle member connected with said body portion and arranged to brace the sides thereof, a bolster mounted on said angle member, and a king bolt extending through said bolster and into said angle member.

4. In an angle road truck, a body, a plurality of traction wheels for supporting said body, a bracing member mounted on said body, a bolster arranged on said bracing member, said bracing member being formed of a beam hollowed out centrally for defining end bracing members, and a king bolt for pivotally holding said bolster in position.

5. In an angle road truck, a body portion, traction wheels therefor, a bracing member connected with said body portion, a bolster mounted on said bracing member formed with a hollowed out central portion defining raised end members, and a capping strip extending between said end members, and a king bolt for holding the bolster in place.

In testimony whereof I affix my signature in presence of two witnesses.

ROBERT W. ROSEBROUGH.

Witnesses:
C. H. CHAMBREAU,
C. A. KRESSMANN.

---

Copies of this patent may be obtained for five cents each, by addressing the "Commissioner of Patents, Washington, D. C."